Patented July 10, 1928.

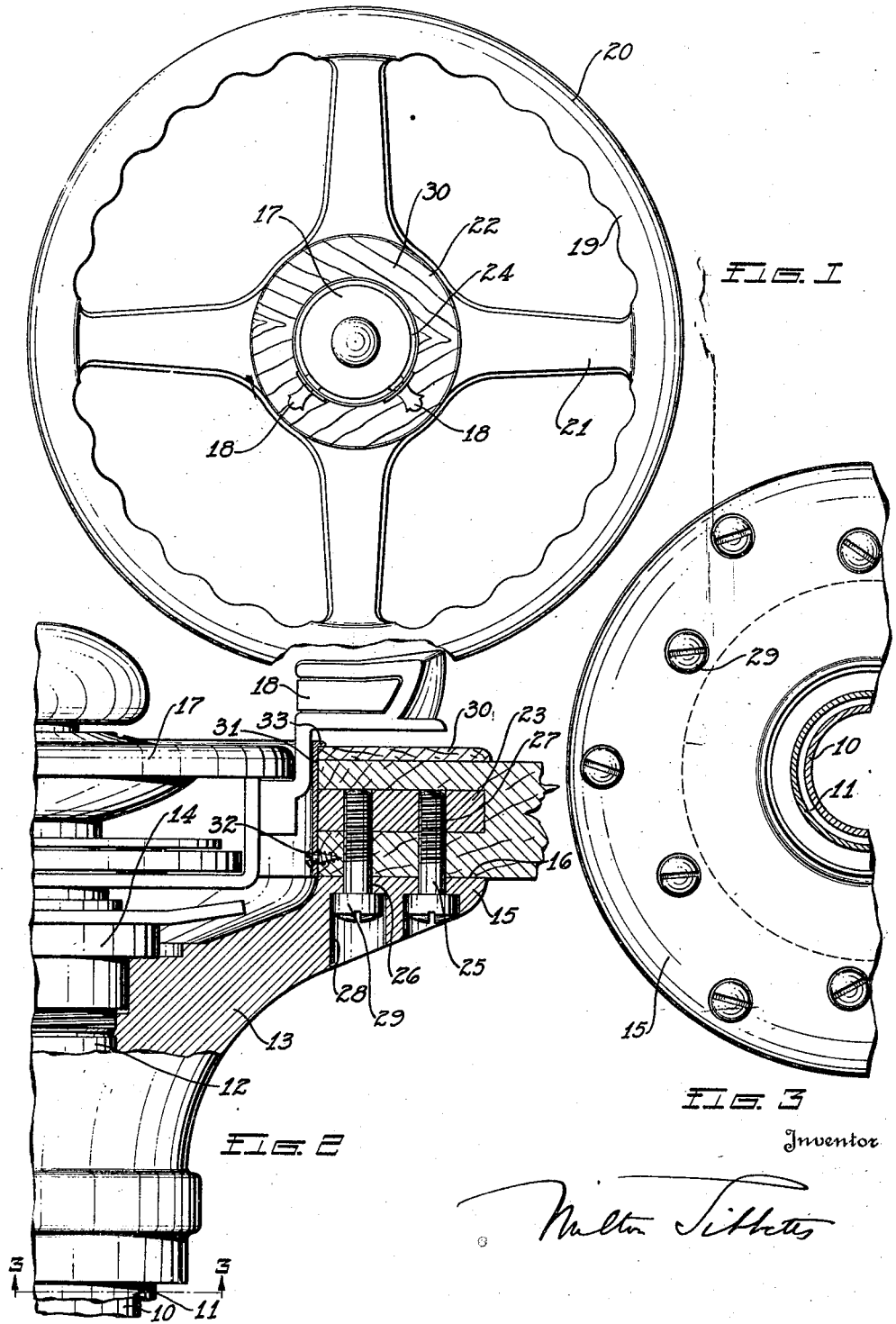

1,676,878

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Original application filed April 7, 1923, Serial No. 630,457. Divided and this application filed May 21, 1927. Serial No. 193,137.

This application is a division of Serial No. 630,457, filed April 7, 1923.

The invention relates to motor vehicles and particularly to the steering mechanism thereof.

One of the objects of the invention is to provide a steering mechanism with simple mechanical means for securing the steering wheel to the steering post.

Another object of the invention is to provide a steering mechanism with a wood or other non-metallic steering wheel secured to the steering post entirely from underneath the wheel.

Another object of the invention is to provide a steering mechanism with simple and inexpensive means to secure a steering wheel having a wooden, composition or other non-metallic hub to the steering post.

Other objects of the invention will appear from the following description taken in connection with the drawings, which form a part of this specification, and in which:

Fig. 1 is a plan view of a steering mechanism made in accordance with this invention;

Fig. 2 is an enlarged sectional view substantially on the line 2—2 of Fig. 1, and Fig. 3 is an underneath view of the steering post head, the section being taken substantially on the line 3—3 of Fig. 2.

Referring to the drawings, 10 represents a steering post of a motor vehicle steering mechanism or steering gear. At its lower end it is adapted to be connected to suitable gearing which in turn connects with the pivoted steering wheels at the front of the vehicle.

A stationary tube 11 usually surrounds the steering post to provide a mounting for the latter. The upper end of the steering post is indicated at 12 and to it is secured a casting 13 as by a nut 14 which is threaded on the steering post. This casting 13 forms an enlargement of the upper end of the steering post and it extends radially in the form of a circular flange 15, with an upper face 16 which is adapted to receive a steering wheel.

The steering post 10 is preferably in the form of a tube and certain of the motor control devices extend upwardly through the steering post. These control devices are indicated generally at 17 and one of their parts or handles 18 may be seen as extending laterally or radially to a point directly over the face 16 of the enlarged end of the steering post. This makes the handle 18 very accessible to the operator.

The control devices 17 may be withdrawn as a unit from the steering post but because of the connections at their lower ends this is a somewhat difficult operation and it is desirable, therefore, that the steering wheel may be mounted on the steering post and dismounted therefrom without disturbing the control devices. This is possible in the form of the invention shown herein.

A steering wheel is indicated at 19 and it is formed of a rim 20 and several spokes 21, as well as a hub 22. All of these parts are preferably made of wood, composition or other non-metallic material and for the purpose of giving strength to the circular hub 22 a reinforcing or stiffening member is provided, such as the metal ring 23 in the hub of the wheel, as shown particularly in Fig. 2. This member may be made of any desired form, and is inserted in a suitable recess in the hub of the steering wheel.

The opening in the hub of the steering wheel is slightly larger than the housing of the control devices 17 so that a slot 24 is left through which the shank of the handle 18 may pass. It will be seen that the handles are far enough above the face 16 of the enlarged end of the steering post to permit the hub of the steering wheel to be passed over the handles and finally between the handles and the face 16 so that the underneath face of the hub of the steering wheel rests on the face 16, as shown particularly in Fig. 2.

The steering wheel is secured to the flanged part 15 of the upper end of the steering post by means passing from the flange to the hub of the steering wheel. As shown, this means is a series of machine screws 25 which pass through spaced holes 26 in the flange of the supporting member, and into the wheel hub, having threaded engagement with the reinforcing ring 23, as shown at 27. The holes 26 are counterbored as at 28 from below the flange 15, for the reception of the heads 29 of the screws 25. In this manner these screws are concealed from view and are at the same time readily accessible when it is desired to demount the wheel.

For the purpose of ornamentation and finish, the steering wheel is preferably provided with a plate 30 which may be of metal or, as is shown herein, of wood, the surface of which may be highly polished to give an ornamental finish to the hub of the wheel. A ferrule 31 is secured to the inner face of the hub as by screws 32 and a flange 33 thereon secures the plate 30 in place, though, of course, this plate would probably also be firmly glued to the hub of the steering wheel.

It will be understood that various forms of the invention other than those described above may be used without departing from the spirit or scope of the invention.

Having thus described the invention, what is claimed and desired to be secured by Letters Patent is:

1. In a steering mechanism, in combination, a support having a face to receive a steering wheel, a steering wheel comprising a wooden hub having a metal insert therein, and attaching means extending from said support into said metal insert to secure the wheel to the support.

2. In a steering mechanism, in combination, a support having a face to receive the hub of a steering wheel, a steering wheel having a metal ring inserted in its hub, said wheel being adapted to fit on said support, and machine screws extending from said support into the hub of said steering wheel and into said ring.

3. In a steering mechanism, in combination, a support having a face to receive a steering wheel, a non-metallic steering wheel comprising a hub having a metal insert therein, and attaching means including screws extending from said support into said hub and threaded into said insert to secure the wheel to the support.

4. A steering mechanism comprising a support having a face to receive a steering wheel, a non-metallic steering wheel having a metal insert including a ring at the inner edge of its hub, and screws engaging said support and threaded into said ring to secure the wheel to said face.

5. A steering mechanism comprising a support having a face to receive a steering wheel, a wheel having a metal ring inserted in its hub, and spaced screws having heads in said support and having threaded engagement with said ring to firmly secure said wheel against said face.

6. A steering mechanism comprising a support having a circular flange defining a face and spaced holes passing through said flange and said face, a steering wheel having a metal reinforcing insert, and screws in said holes passing into said wheel and having threaded engagement with said insert to rigidly secure the wheel to said face.

In testimony whereof I affix my signature.

MILTON TIBBETTS.